United States Patent [19]

Tiegel

[11] 4,102,638
[45] Jul. 25, 1978

[54] APPARATUS FOR BURNING TOGETHER LEAD STORAGE BATTERY POSTS AND HIGH PROFILE BUSHINGS

[75] Inventor: Eric G. Tiegel, San Carlos, Calif.

[73] Assignee: Tiegel Manufacturing Company, Belmont, Calif.

[21] Appl. No.: 744,541

[22] Filed: Nov. 24, 1976

[51] Int. Cl.² ............................................. F24J 3/00
[52] U.S. Cl. ............................. 432/229; 164/DIG. 1; 432/230
[58] Field of Search .................. 432/229, 230, 10; 266/56; 164/DIG. 1

[56] References Cited

U.S. PATENT DOCUMENTS

| | | | |
|---|---|---|---|
| 1,238,257 | 8/1917 | Butler | 432/230 |
| 1,841,194 | 1/1932 | Lormor | 432/10 X |
| 2,573,266 | 10/1951 | Melcher et al. | 432/230 |
| 2,743,692 | 5/1956 | Wietzel et al. | 432/229 |
| 3,493,035 | 2/1970 | Tiegel et al. | 164/334 |
| 3,806,896 | 4/1974 | Young et al. | 219/137 R |
| 3,980,126 | 9/1976 | Eberle | 164/271 |

Primary Examiner—John J. Camby
Attorney, Agent, or Firm—Benasutti Associates, Ltd.

[57] ABSTRACT

Burners are provided above a battery for burning together high profile bushings inserted in the battery cover and lead posts extending generally upward from the battery. The high profile bushings surround the battery posts. In order to insure a complete weld throughout the entire lead bushing and post, the burners are supported in such a way as to orbit between the bushing and post. The burners orbit within this support in close proximity to the heat of the burner flame. To provide heat insulation from the tips of the burner, a heat shield is provided intermediate the battery post and bushings and the rotation mechanism of the burners themselves. Means for automatic ignition of the burners are provided as well as molds for the battery posts and bushings. The molds are provided with a water cooling capability and a separating means which surrounds the molds and holds the battery motionless as the molds are retracted after the burning has taken place.

19 Claims, 5 Drawing Figures

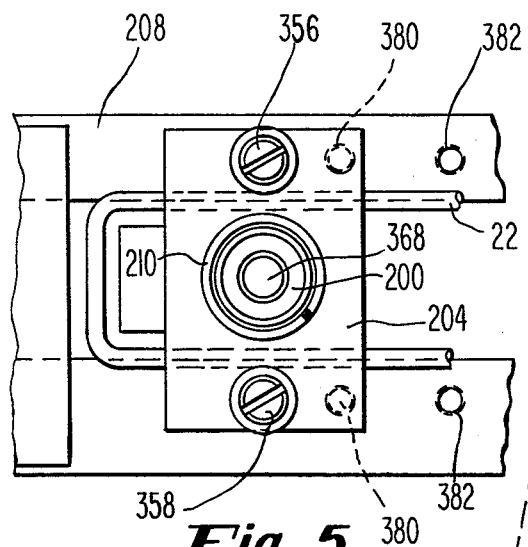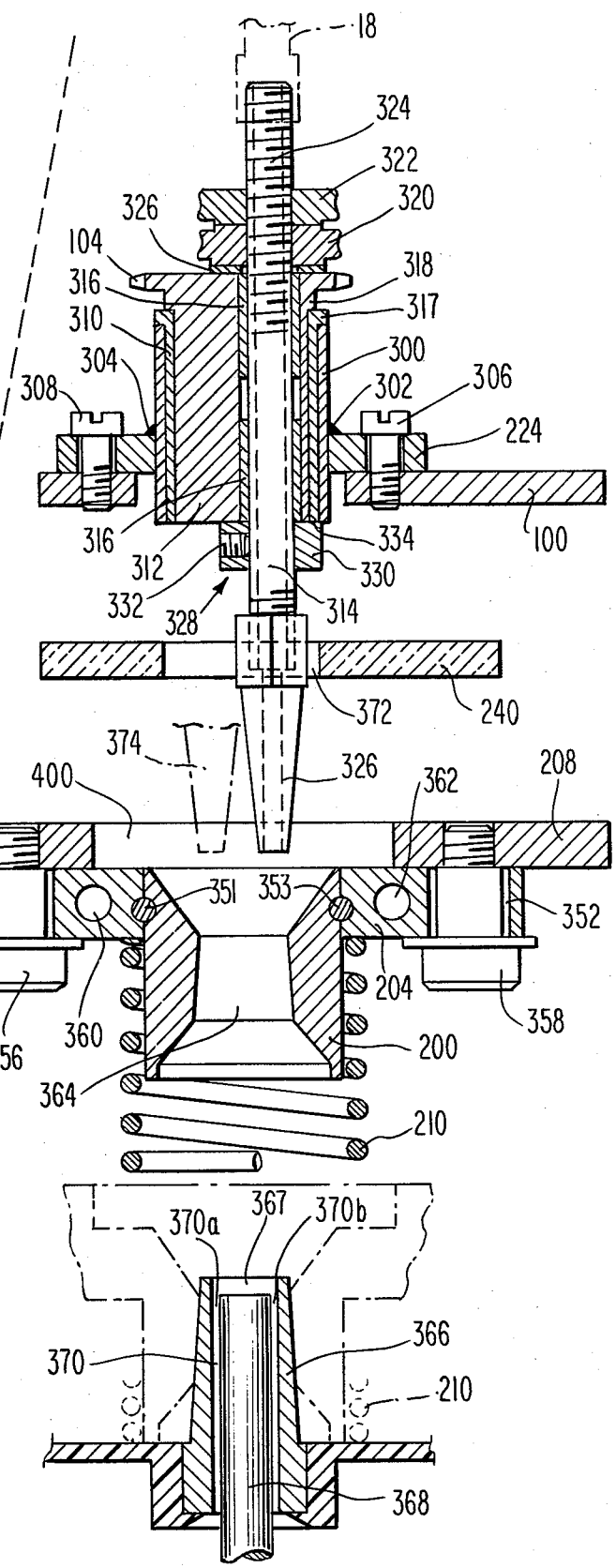

APPARATUS FOR BURNING TOGETHER LEAD STORAGE BATTERY POSTS AND HIGH PROFILE BUSHINGS

BACKGROUND OF THE INVENTION

I. Field of the Invention

This invention relates to an apparatus for joining together lead battery posts and lead bushings.

II. Description of the Prior Art

In forming a completed battery terminal, high profile lead bushings are placed into an injection molded battery cover, the bushings and lead post over which the bushing fits protruding upward for a substantial length. The battery posts and bushings are welded together. The burning is directed at the post and melting starts at the top of the post and some of the material flows down cooling as it contacts the remaining mass of the lead post preventing full fusion near the bottom of the post. The mass of the post is so great that in order to get sufficient heat transfer, a very strong torch must be used in order to weld the post to the bushing. In high profile bushings then, it is very difficult to accomplish complete fusion since the molten lead acts as an insulating layer when it freezes, preventing further fusion of the post to the bushing.

In Lormor's U.S. Pat. No. 1,841,194, an apparatus for lead burning storage battery terminal posts and connectors is described. This patent describes storage batteries "provided with a number of cells having upstanding terminal posts to which connectors are applied." The adjoining cells are connected by cross connectors which are lead burned to the terminal posts. Each cross connector consists "of a strap having sockets at its opposite ends designed to be fitted over the two posts of adjoining cells which are to be connected together."

In the Lormor patent, burners are described which extend down vertically from a support labelled 15, toward the battery. The support 15 is given an oscillatory movement "for the purpose of giving the burners a simultaneous rotary motion so that the individual flames will travel around the peripheries of the terminal posts". The burners are not free to rotate within the plate 15 but move with the movement of the plate.

In the Tiegel et al U.S. Pat. No. 3,493,035, an apparatus for joining battery posts is described. In this patent, molds are provided for encircling pairs of post members and heat producing means is provided to produce heat adjacent to pairs of the post members encircled by the molds. Thus, the post members are melted and allowed to fuse together. In addition, hold-down means are provided with the apparatus adjacent to the molds for holding the cell plate structures against movement when the molds are moved from their post encircling position.

SUMMARY OF THE INVENTION

Lead bushings are inserted in a battery cover. When the cover is placed on the battery, the bushings surround lead battery posts which extend generally upward from the battery. The bushings have a high profile, extending upward with the battery posts for a considerable length when the cover is placed on the battery. It is difficult to attain a complete burning together of the bushings and the battery posts because, with the high profile, a deep annular channel is created between the bushing and the post making it difficult to transmit the heat of the flame to the bottom of the post and, as the post begins to melt, the mass of lead flows down the channel encountering the mass of cold metal below and solidifying thereby acting as an insulation for further welding of the post and the bushing near the bottom of the post. To overcome this problem, it is desirable to direct an orbiting flame from a support directly above the battery, to the region between the bushing and the post. It is desirable to have the burners trace an orbitable path directed more at the bushing than at the top of the post.

In this apparatus for burning together a lead battery post and a lead bushing which surrounds the battery post, an orbitable torch burner means is provided. In the preferred embodiment, a first bushing is provided which is fixedly mounted to a fixed support which is welded to a torch burner support plate. A burner rotation body is inserted into the first bushing and rotates within it. The rotation body is provided with a round hole therethrough, said hole having a pair of second bushings fixedly mounted within. A burner tube is inserted into the hole in the rotation body allowing the rotation body to rotate about the burner tube. The hole in the rotation body has a vertical axis and is spaced apart from the vertical axis of the rotation body. Hence, when the rotation body rotates, the tip portion of the burner tube traces out an orbitable path without rotation of the burner tube about its own axis. In the preferred embodiment as shown in this disclosure, rotation of the rotation body is derived from a sprocket wheel which is attached to the rotation body and which engages a chain. A motor drive is used to rotate the chain. The frictional engagement of the fuel source tube with the burner tube as the burner tube fits within the source tube provides a restraining means for restraining the burner tube from rotation about its own axis as it follows the rotation of the rotating body.

Because the rotation mechanism is in close proximity to the battery post and bushing, that is, immediately above, a heat shield means is required in order to insulate the rotation mechanism from the burner flame which is directed at the battery post and bushing.

Torch self-ignition means are also provided and fixed to the apparatus adjacent to the tips of the burner tubes.

Mold means are provided with the apparatus which form molds around the battery post and bushing at the time that the burn takes place. The molds can be provided with a water cooling means and with a mold separating means. The separating means acts to hold the battery stationary when the molds are retracted after the burning process has taken place thereby preserving the weld.

Accordingly, it is an object of this invention to provide a means whereby the burners can be rotated in a circular path within the support plate and directly above the post and bushing. This will ensure a more accurate and complete burning together of the battery post and bushings.

It is another object of the invention to provide a heat shield means to insulate the rotation body in the support plate from the flame of the burner tube.

It is another object of the invention to provide a torch self-ignition means for the burners.

Another object of the invention is to provide a mold means whereby molds can be formed around the battery post and bushing.

Another object of the invention is to provide a separating means for holding the battery stationary when the molds are retracted after the burning process has taken place.

This and other objects of my invention will become apparent from the following description with reference to the accompanying drawings.

BRIEF DESCRIPTION OF THE DRAWINGS

FIG. 4 is an enlarged section taken on line 4—4 of FIG. 3;

FIG. 5 is an enlarged section taken along the line 5—5 in FIG. 3.

DETAILED DESCRIPTION OF THE DRAWINGS

Figure 1:
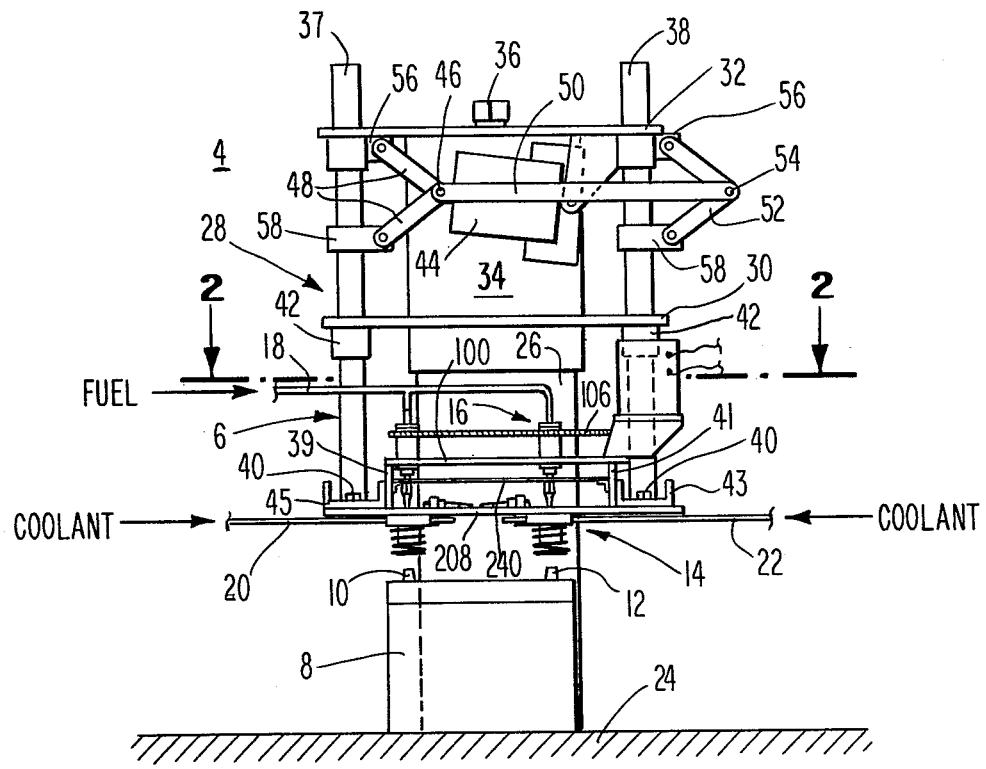
FIG. 1 is a front view in elevation of the apparatus of this invention.

Referring now to FIG. 1, an apparatus for burning together lead battery posts and lead battery bushings is generally indicated at 4. The apparatus consists of a frame 6, a battery 8, lead battery posts and lead bushings 10 and 12, a mold assembly designated generally 14, and a torch assembly designated generally 16. Also shown is fuel source tube 18 for providing fuel to the burners and water coolant lines 20 and 22 for cooling the molds.

The frame 6 includes a base 24 for supporting a battery 8 and a post 26 extending upwardly from the rearward side of the base 24. A carrier 28 to which the mold assembly 14 and the torch assembly 16 are connected comprises a pair of plates 30 and 32 secured to a sleeve 34 slidably mounted on the post 26. The carrier is mounted for vertical adjustment by a bolt 36, the unthreaded portion of which is rotatably journelled in a plate at the center of the sleeve 34, and the lower threaded portion of which is threaded into an insert secured to the inside of post 26. Rotation of the bolt causes the carrier to be moved upwardly or downwardly depending on the direction in which the bolt 36 is rotated. A detailed breakaway of this portion of the apparatus can be found in FIG. 3 of my previous U.S. Pat. No. 3,493,035.

Torch assembly 16 is connected to vertical support plates 39 and 41 which are connected to plate channel supports 43 and 45. Mold assembly 14 is connected to plate channel supports 43 and 45 by bolts 40. The plate channel supports 43 and 45 are connected to rods 37 and 38 which extend upwardly through sleeved bearings 42 in the plates 30 and 32 so as to mount the mold assembly 14 and torch assembly 16 in a vertical direction. The mold assembly and torch assembly and its associated rods 37 and 38 are adapted to be moved in a vertical direction by an air cylinder 44 connected to plate 32. The plunger of cylinder 44 is connected by a pin 46 to a pair of toggle linkages 48 and also to one end of a pair of elongated links 50, the other ends of which are connected to a pair of toggle linkages 52 by a pin 54. The upper links of each of the toggle linkages 48 and 52 are connected to ears 56 connected to the upper plate 32, while the lower links of toggle linkages 48 and 52 are connected to clamps 58 secured to the rods 37 and 38.

Figure 2:
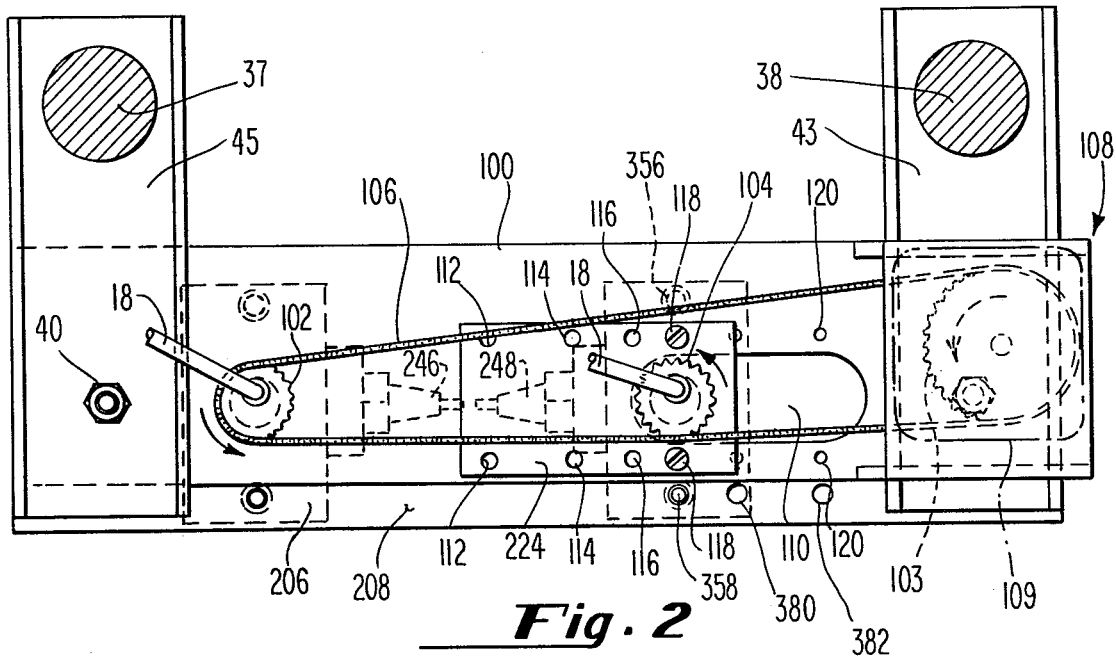
FIG. 2 is an enlarged plan view as seen from the line 2—2 of FIG. 1.

Looking down on the apparatus along the line 2 in FIG. 1, one can see the drive means of the torch assembly. This is shown in FIG. 2. A torch burner support plate for supporting the torch burners above the lead battery posts and lead bushings to be burned is designated 100 in FIG. 2. Attached to the top of the torch burners to be described more fully below are sprocket wheels 102 and 104. Fuel source tubes 18 are shown passing through the sprocket wheels to the burner tubes below. The chain 106 engages the sprockets of the sprocket wheels 102 and 104 and the sprocket wheel 103 of the drive motor. The drive motor is shown in a breakaway and designated generally 108.

Figure 3:
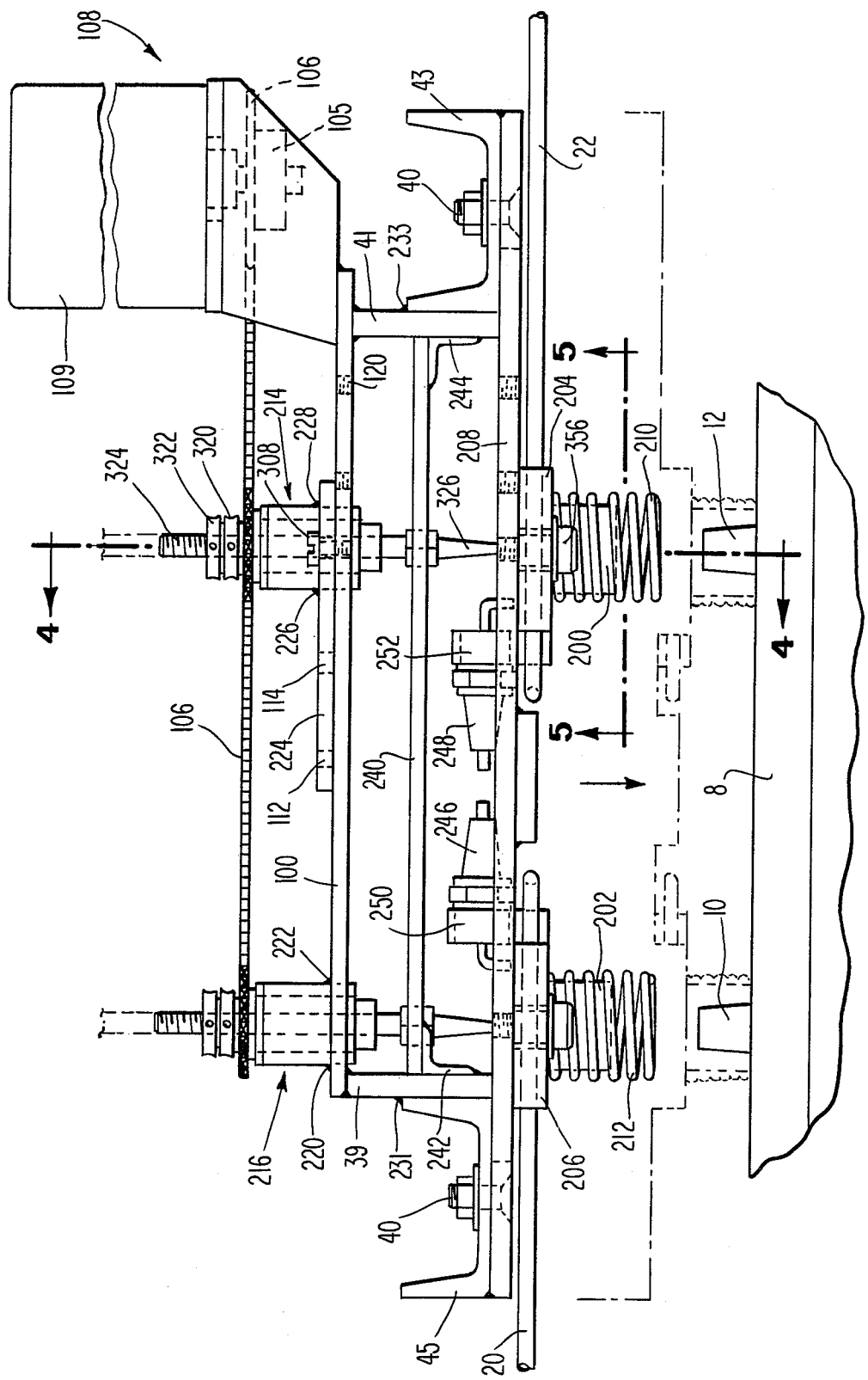
FIG. 3 is an enlarged front view in elevation of a portion of the apparatus shown in FIG. 1.

Referring now to FIG. 3, molds 200 and 202 are shown attached to mold plates 204 and 206 which are connected to mold support plate 208. Surrounding the molds 200 and 202 are springs 210 and 212. When the apparatus is in the burn position, the molds surround the lead battery posts and lead bushings shown as 10 and 12 in FIG. 3. The molds and springs are also shown in phantom in FIG. 3. The torch burners designated generally 214 and 216 are shown attached to the torch burner support plate 100. The fixed support of torch burner 216 is welded at 220 and 222 directly to the torch burner support plate 100, but the fixed support of torch burner 214 is welded to a template 224 at welds 226 and 228. Referring back to FIG. 2, we see torch burner support plate 100 with an elongated oval opening or slot 110. The template 224 has a series of hole pairs 112 to 118, hole pair 118 shown with screws inserted therein. Another series of hole pairs is set in the torch burner support plate 100, one such pair of holes being holes 120. By lining up a pair of holes in the template 224 with a pair of holes beneath the template in burner support plate 100, one can adjust the separation between the torch burners 216 and 214 of FIG. 3. This adjustment in separation can be made without adjusting the chain or drive means since it will be seen from FIG. 2 that the chain tangentially engages the sprocket wheels 102 and 104 of torch burners 216 and 214 along a linear path which is in near alignment with the length of slot 110.

The burner support plate 100 is shown in FIG. 3 to be mounted on vertical support plates 39 and 41. As shown in FIG. 3, this particular embodiment has the burner support plate extending beyond vertical support plate 41 so as to provide a support for the drive motor 105 and drive motor housing 109 designated collectively 108. The vertical support plates 39 and 41 are welded to plate channel supports 45 and 43. The posts 37 and 38 are connected to the plate channel supports behind the mold assembly and torch burner assembly. This is shown in FIG. 2. The mold support plate is bolted from below to plate channel supports 45 and 43.

The molds 204 and 206 are shown with water cool pipes 20 and 22.

In FIG. 4, details of the torch burner means 214 are shown. The torch burner fixed support 300 is shown welded at 302 and 304 to the template 224. Bolts 306 and 308 attach template 224 to torch burner support plate 100. First bushing 310 is fixedly attached to burner support tube 300. The burner rotation body 312 fits within the first bushing 310 and is free to rotate therein. The top surface portion of rotation body 312 is a sprocket wheel 104 which provides a means for engagement with the drive means. Rotation body 312 is a cylindrical body having a hole therethrough into which a burner tube 314 is inserted. A pair of second bushings is fixedly attached within the hole in the rotation body and surrounds the burner tube 314. The pair of second bushings is denoted 316.

It can be seen from the drawing in FIG. 4 of the burner tube that the rotation body 312 is prevented from slipping through the first bushing 310 by the upper shape of both the bushing 310 and the rotation body 312. The bushing 310 extends above the support tube 300 and forms a right angle section 317 covering the top surface of the support tube 300. The rotation body above the bushing 310 is somewhat wider than its portion below and is thereby supported at 318 on the bushing surface 317 above the support tube 300. The burner tube is prevented from slipping through the second bushing 316 by the interaction of the height adjusting nuts 320 and 322 with the upper threaded portion 324 of the burner tube 314. A washer 326 is placed intermediate the height adjusting nut 320 and sprocket wheel surface 104 of the rotation body 312. The height adjusting nuts, washer and upper threaded portion of the burner tube provide a means for adjusting the height or position of the burner tube within the rotation body.

To provide a means for locking the burner tube within the rotation body during the burning period and to prevent the burner tube from being thrust out of the rotation body in an upward direction through the second bushing 316 when ignition of the burner tip 326 takes place, the set screw arrangement 328 is provided. In a housing 330 through which the burner tube is inserted, a threaded hole is provided. A set screw 332 is inserted therein to press against the burner tube 314 and the housing 330 engages the rotation body 312 along the surface 334. The source tube 18 is shown frictionally engaging the threaded portion of the burner tube thereby preventing rotation of the burner tube about it axis while the burner tube orbits with the rotation body.

The mold 200 is pinned into place within mold plate 204. Surrounding the mold is a spring 210. The mold plate 204 can be positioned in various locations in the mold support plate 208 by lining up the holes 352 and 354 in the mold plate 204 with holes in the mold support plate. FIG. 5 shows the presence of the mold support plate holes at 380 and 382. Screws or bolts 356 and 358 then rigidly attach the mold plate 204 to the mold support plate 208. Holes 360 and 362 in FIG. 4 are shown ready to receive the cooling line. The mold void 364 is suitably shaped to fit over the lead bushing surrounding the lead post of the battery as shown in phantom in the lower part of FIG. 4. Details of lead bushing and post 10 of FIG. 1 are shown in the lower part of FIG. 4 with the lead bushing as 366 and the lead post as 368. In particular, this lead bushing is a high profile bushing, that is, it extends upward with the post for a considerable length 367. Also, there exists a gap 370 which surrounds the post 368 and is intermediate the post 368 and the lead bushing 366. When burning together the post and the bushing with the flame of the burner, it is highly desirable to orbit the burner and thereby the flame in this gap 370 between the posts 368 and the bushing 366. The torch burner assembly described throughout the specification performs that function in this way. The cylindrical rotation body 312 of the torch burner 214 is circular in cross section as is the hole within the rotation body. The axis of the rotation body is spaced apart from the axis of the hole and both are vertical. Hence, when the rotation body sprocket wheel 104 engages the chain 106, the rotation body will rotate as the chain rotates driven by the drive motor. As this happens, the burner tube follows the rotation body in an orbitable path. The source tube, providing fuel to the burner tube, frictionally engages the top portion of the burner tube and the burner tube is not free to rotate about its own axis. Tip 326 of burner tube 314 in FIG. 4 is shown positioned to direct the flame into the gap portion 370b; after 180° of rotation, the tip 326 of burner tube 314 (shown now in phantom) now directs the flame into the gap portion 370a. By this rotation of the burners about the lead bushings and posts, a more thorough, reliable and better performing weld is created.

The spring 210 surrounding the mold 200 is compressed when the mold moves down and fits around the lead bushing. The compressed spring 210 is shown in phantom in the lower part of FIG. 4. After the burning process is complete and the lead bushing has been burned together with the lead post, the mold must be removed without disturbing the recently formed mold. The compression of the spring 210 downward on the battery cover holds the battery in place while the mold is retracted. This serves to provide a means for separating the mold from the battery without breaking the recently completed weld of the lead bushing to the lead post.

When the burner tube assembly 16 and molds 200 and 202 are in the burn position surrounding the lead battery post, it will be seen that the torch burner assembly 16 will be in close proximity to the lead battery post and bushing, which is the region to be burned with the high temperature flame. When the heat is reflected from the molds and lead bushings and posts, it will heat up the rotation body 312, bushing surfaces 310 and 316, and burner tube 314 in the torch burner 214. In order to prevent this from happening, a means for shielding and insulating the torch burner 214 in the torch burner support plate 100 from the heat is provided by a heat shield 240. The heat shield 240 is shown attached to the vertical support plates 39 and 41 by supports 242 and 244 in FIG. 3. The heat shield is placed intermediate the burner support plate and mold plate in this particular embodiment. In order to allow the torch burner tube 314 to rotate with the rotation body 312, a circular hole 372 is provided in the heat shield.

In FIG. 3, spark plugs 246 and 248 are shown attached to mold support plate 208 by mounting collars 250 and 252. In the embodiment described by these drawings, the spark plug is located adjacent to the burner tips, as for example, spark plug 248 near burner tip 326. This provides the apparatus with a torch self-ignition means.

The present invention provides an apparatus for automatically burning together lead battery posts and high profile bushings which results in a reliable and complete weld.

Various changes could be made in the embodiment described herein without departing from the scope of the invention. Accordingly, it is intended that the descriptions above shall be interpreted as illustrative of various embodiments of the invention but they shall not be interpreted as limiting the scope of the invention which is defined in the appended claims.

What is claimed is:

1. An apparatus for burning together a lead battery post and a lead bushing surrounding said battery post, comprising:
   (a) an orbital torch burner means for applying heat in an orbital path between said post and said bushing; and
   (b) a torch burner support plate for supporting a torch burner means immediately above said post and bushing, said orbitable torch burner means rotating in said support plate in close proximity to said battery post and bushing.

2. The invention of claim 1 wherein torch self-ignition means for automatically igniting the burner means is attached to said apparatus adjacent to the torch burner means.

3. The invention of claim 1 wherein said apparatus comprises a plurality of orbital torch burner means for simultaneously burning together a plurality of lead battery post and lead bushing pairs.

4. An apparatus for burning together a lead battery post and a lead bushing surrounding said battery post, comprising:
   (a) an orbital torch burner means for applying heat in an orbital path between said post and said bushing;
   (b) a torch burner support plate for supporting a torch burner means immediately above said post and bushing, said orbital torch burner means rotating in said support plate in close proximity to said battery post and bushing; and
   (c) a heat shield means attached to said apparatus intermediate said burner support plate and said lead post and bushing for insulating said orbital torch burner means from the heat generated by the flame of the burner means.

5. An apparatus for burning together a lead battery post and a lead bushing surrounding said battery post, comprising:
   (a) an orbital torch burner means for applying heat in an orbital path between said post and said bushing, said orbital torch burner means comprising:
       (i) a burner tube for supplying fuel from a source to a tip portion of said tube for burning of said fuel;
       (ii) a burner rotating body having a hole therethrough for receiving said burner tube;
       (iii) a first bushing for supporting said rotation body in a fixed support and for allowing said rotation body to rotate freely therein; and
       (iv) a second bushing means fixedly mounted within said hole engaging said burner tube to permit said rotation body to rotate about its axis while said tube remains fixed with respect to its axis; and
   (b) a torch burner support plate for supporting a torch burner means immediately above said post and bushing, said orbital torch burner means rotating in said support plate in close proximity to said battery post and bushing.

6. The invention of claim 5 wherein said orbiting torch burner means further comprises restraining means engaging said burner tube for restraining it from rotating within said body as said body rotates, whereby said tips orbit about the axis of said body without rotation of said tips.

7. The invention of claim 6 wherein said restraining means comprises a source tube for supplying fuel to said burner tube, said source tube frictionally engaging said burner tube.

8. The invention of claim 5 wherein said burner rotation body is a cylindrical body with a vertical axis having a hole therethrough with a vertical axis.

9. The invention of claim 8 wherein the axis of the hole in the cylindrical body is spaced apart from the axis of the cylindrical body.

10. The invention of claim 5 wherein said torch burner means has a height adjusting means for positioning said burner tube with respect to said burner rotation body.

11. The invention of claim 10 wherein said height adjusting means comprises a burner tube with a threaded portion extending above the top surface of said rotation body for engagement with height adjusting nuts and a locking means below said rotation body for preventing upward movement of the burner tube when said burner tube is ignited.

12. The invention of claim 5 wherein said apparatus comprises a drive means for rotating said torch burner means in said support plate and said rotation body comprises an engagement means attached to said body for engaging said drive means.

13. The invention of claim 12 wherein said engagement means comprises a sprocket wheel and said drive means comprises a rotating chain driven by a motor means, said chain engaging the sprockets of said rotation body.

14. An apparatus for burning together a lead battery post and a lead bushing surrounding said battery post, comprising:
   (a) an orbital torch burner means for applying heat in an orbital path between said post and said bushing;
   (b) a torch burner support plate for supporting a torch burner means immediately above said post and bushing, said orbital torch burner means rotating in said support plate in close proximity to said battery post and bushing; and
   (c) a battery post mold attached to said apparatus for forming a mold around said bushing and said post.

15. The invention of claim 14 wherein said apparatus further comprises a mold separating means for holding the battery motionless while the molds are retracted.

16. The invention of claim 15 wherein said separating means comprises a spring surrounding said mold and attached to said apparatus.

17. The invention of claim 13 wherein said apparatus comprises a plurality of orbitable torch burner means for simultaneously burning together a plurality of lead battery post and lead bushing pairs.

18. The invention of claim 17 wherein said apparatus comprises a torch burner spacing adjustment means for varying the spacing between adjacent burner means for mating of said apparatus with different size batteries.

19. The invention of claim 18 wherein said spacing adjustment means comprises a torch burner support plate for supporting said plurality of torch burner means, said support plate having an elongated oval slot therein; a template for mounting at least one of said torch burner means to said support plate in any of a preselected number of mounting positions along the length of said slot, said length being in near alignment with the length of chain defined by the tangential engagement of said chain with said sprocket wheel of said torch burner means mounted on said template, the engagement of said chain with a sprocket wheel of an adjacent torch burner means and the engagement of said chain with said motor means.

* * * * *